Jan. 30, 1962   J. R. OISHEI   3,018,501
WINDSHIELD WIPER
Filed Oct. 7, 1959
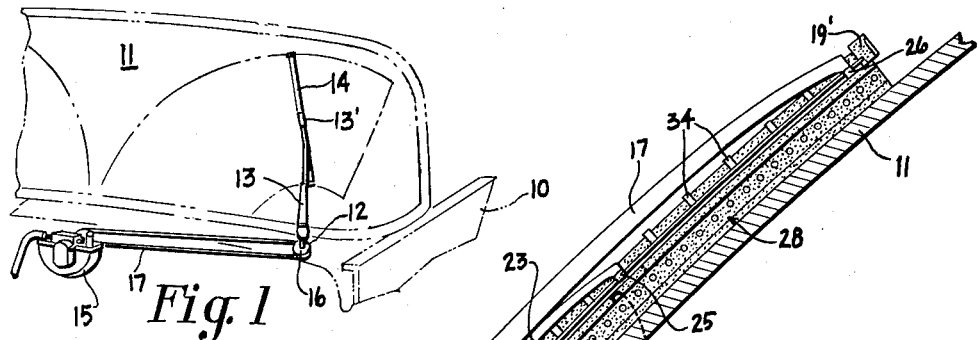
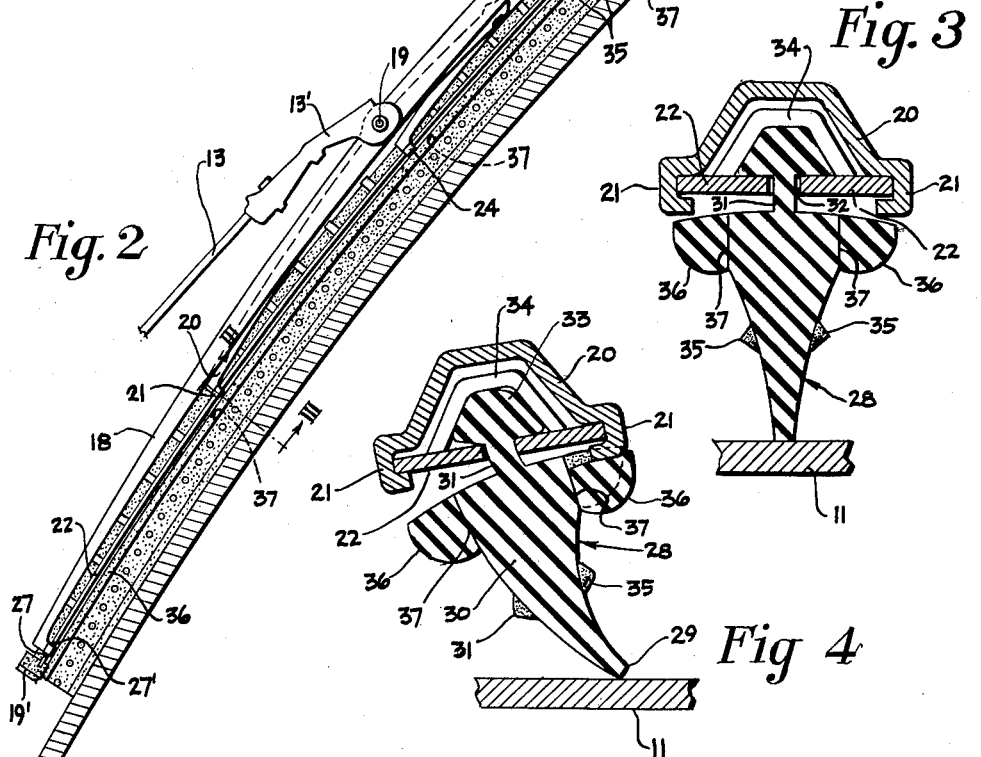
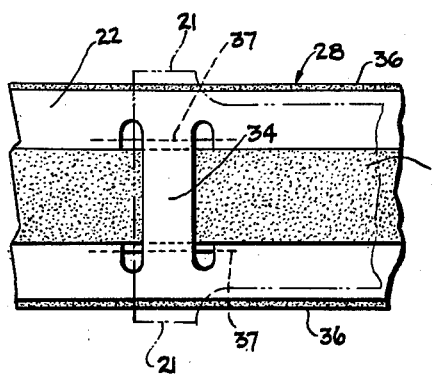
INVENTOR.
JOHN R. OISHEI
BY
Bean Brooks Buckley Bean
ATTORNEYS

United States Patent Office 3,018,501
Patented Jan. 30, 1962

3,018,501
WINDSHIELD WIPER
John R. Oishei, Buffalo, N.Y., assignor to Trico Products Corporation, Buffalo, N.Y.
Filed Oct. 7, 1959, Ser. No. 844,950
3 Claims. (Cl. 15—250.42)

The present invention relates to the windshield cleaning art and, more particularly, to an improved wiper blade for cleaning curved windshields.

It is one object of the present invention to provide a windshield wiper blade having improved wiping action because the stability of the wiping element against lateral distortion is increased by the use of beads of substantial size extending continuously along the entire length of the wiping element, these beads being uniquely associated with the remainder of the wiping element in such a manner so as to in no way transmit distortion necessarily experienced thereby during blade operation to the wiping lip of the wiping element.

Another object of the present invention is to provide an improved windshield wiper blade including a wiping element which is of uniform cross-sectional configuration throughout its length and which has a relatively small number of longitudinally extending reinforcing beads thereon, thereby not only permitting it to be manufactured at a lower cost, but also increasing its tendency to flex in the desired gradual manner under all conditions of operation. Other objects and attendant advantages of the present invention will readily be perceived hereafter.

The improved windshield wiper blade of the present invention includes a superstructure having a clip mounted thereon which is adapted to receive the tip of a wiper arm. The superstructure consists of a plurality of yoke-like members which are adapted to transmit the force supplied by the wiper arm to a flexible resilient backing strip which is movably held by fingers extending from the outer ends of the yoke-like member. The backing strip, in turn, mounts a flexible rubber wiping element. In accordance with the present invention, a longitudinal bead of substantial size is located on each side of the rubber wiping element directly adjacent the flexible backing strip. These longitudinal beads are continuous throughout the length of the wiping element and spaced longitudinal portions thereof are engaged by the above-mentioned fingers of the blade superstructure during blade operation. Proximate the juncture of the beads and the remainder of the wiping element and in the vicinity of the fingers, slits are provided in the wiping element. These slits permit the bead to be distorted in a vertical direction to accommodate the action of the blade without permitting this distortion to be transmitted to the wiping lip. Since the beads are continuous throughout the length of the wiping element, they greatly enhance the stability of the wiping element against lateral distortion. Thus a blade structure is provided which is greatly reinforced against lateral distortion by an arrangement which in no way interferes with proper blade operation. Furthermore, the slits which act in the above-described manner permit the wiping element to possess a desirable low silhouette in addition to the above-described increased lateral stability, because the continuous beads can be located directly adjacent the flexible backing strip. The present invention will be more fully understood when the following portions of the specification are read in conjunction with the accompanying drawings wherein:

FIG. 1 is a fragmentary perspective view of an automotive vehicle mounting a windshield wiper blade made in accordance with the present invention;

FIG. 2 is an elevational view of the wiper blade of the present invention in position on a curved windshield;

FIG. 3 is a view taken along line III—III of FIG. 2;

FIG. 4 is a view similar to FIG. 3 but showing the position which the blade element assumes during blade operation; and FIG. 5 is a fragmentary plan view of a portion of the blade showing particularly the slits of the present invention.

In FIG. 1 an automotive vehicle 10 is shown having a curved windshield 11 thereon. Suitably journaled in the cowl of the vehicle is a rockshaft 12 which mounts wiper arm 13 which, in turn, carries wiper blade 14 by means of clip 13'. A windshield wiper motor 15 is suitably mounted on the firewall of the vehicle and is adapted to cause cable 17 to drive pulley 16 which is mounted on rockshaft 12. The foregoing general orientation and operation is well understood in the art.

The improved wiper blade of the present invention includes a superstructure consisting of levers 17 and 18 which are movably pinned to each other by rivet 19. A spring (not shown) encircles rivet 19 and causes levers 17 and 18 to be biased in a clockwise and counterclockwise direction, respectively, when viewed from FIG. 2. A yoke-like member 20 is also pivotally mounted on rivet 19. The lower end of yoke 20 is formed into fingers 21 which engage opposite edge portions of flexible backing strip 22. The upper portion of yoke 20 is formed into similar fingers which engage opposite sides of the central portion of yoke 23. Yoke 23, in turn, has its ends 24 and 25 formed into fingers which are similar to fingers 21 shown in FIGS. 3 and 4. The ends 26 and 27 of levers 17 and 18, respectively, are also formed into finger-like members such as 21 shown in FIGS. 3 and 4. Thus four sets of fingers are provided at 21, 24, 25, and 26 for slidably engaging opposite edge portions of flexible backing strip 22 for transmitting pressure from wiper arm 13 to wiper blade 28 carried by the backing strip. However, the fingers located at 27 engage a notch 27' in the backing strip for anchoring purposes. Furthermore, rubber caps 19' are mounted on each end of flexible backing strip 22.

Wiper blade 28 includes a wiping lip 29 which extends downwardly from the central portion 30. A reduced neck portion 31 is adapted to fit within slot 32 of flexible backing strip 22. An enlarged top portion 33 of the wiping element 28 is located above slot 32. A plurality of ribs 34 are formed at spaced intervals along the top of the backing strip for the purpose of lending lateral rigidity to the backing strip. Raised protuberances 35 are provided at spaced intervals along each side of the central portion 30 of wiping element 28 in a manner which is known in the art.

In accordance with the present invention, reinforcing beads 36 of substantial size form a part of wiping element 28 and extend uniformly throughout the length thereof. The substantial dimensions of these beads enhance the lateral stability of the blade element by providing pronounced reinforcement against lateral distortion throughout the length of the wiping element 28 during operation. However, slits 37 permit the portions of the beads 36 which are in the vicinity of fingers 21, 24, or 25 to distort in a generally vertical direction, when engaged by these fingers during blade layover, without permitting this distortion to be transmitted to the wiping lip of the wiper element 28. The fact that these slits 37 permit beads 36 to be continuous further permits the rubber wiping element 30 to be fabricated at a lower cost in addition to enhancing the lateral stability of the wiping element 28 without in any way interfering with desirable wiping action.

While a preferred embodiment of the present invention has been described, it is not to be limited thereto but may be otherwise embodied within the scope of the following claims.

What is claimed is:

1. A windshield wiper blade comprising a superstructure, a flexible backing strip, connection means between said backing strip and said superstructure, a wiping element having a central portion with a wiping lip extending therefrom mounted on said backing strip, a reinforcing bead extending continuously along each side of the central portion of said wiping element substantially throughout the entire length thereof, and means operatively associated with said wiping element located proximate said connection means for permitting portions of said beads to be distorted by said connection means during operation of said blade while preventing this distortion from being transmitted to the remainder of said wiping element, said continuity of said beads maintaining a uniform reinforcement of said wiping element against lateral distortion throughout the length thereof.

2. A windshield wiper blade comprising a superstructure, clip means mounted on said superstructure, a flexible backing strip, connection means between said backing strip and said superstructure, a wiping element mounted on said backing strip, a reinforcing bead extending continuously along each side of said wiping element throughout the entire length thereof, and slit means in said wiping element located proximate said connection means to permit portions of said beads to be distorted during operation of said blade without transmitting this distortion to the remainder of said wiping element, said continuity of said beads maintaining a uniform reinforcement of said wiping element against lateral distortion throughout the length thereof.

3. A windshield wiper blade comprising a superstructure, a flexible backing strip, fingers formed at select spaced portions of said superstructure on first and second opposite sides thereof for engaging corresponding select spaced portions of the opposite edges of said backing strip, a wiping element mounted on said backing strip, said wiping element including a central portion having a wiping lip extending downwardly therefrom and another portion in engagement with said backing strip, first and second reinforcing bead means extending on opposite sides of said central portion for lending rigidity thereto against lateral distortion, portions of both said first and second bead means being juxtaposed to said first and second opposed fingers, respectively, and engageable thereby during wiper blade operation, and slit means separating portions of both said first and second bead means from said central portion of said wiping element in the vicinity of said first and second fingers whereby the engagement between said first fingers and said first bead means permits distortion of select portions of said first bead means which are engaged by said first fingers without the accompanying distortion of said central portion and said wiping lip while the continuity of said second bead means which are not then in engagement with said second fingers provides a continuous reinforcement to said wiping element against lateral distortion notwithstanding that said second bead means is also slitted in the area where it is engaged by said second fingers, and whereby after reversal of the wiper blade, the engagement between said second fingers and said second bead means permits the distortion of select portions of said second bead means which are engaged by said second fingers without the accompanying distortion of said central portion and said wiping lip while the continuity of said first bead means which are then not in engagement with said first fingers provides a continuous reinforcement of said wiping element against lateral distortion notwithstanding that said first bead means is also slitted in the area where it is engaged by said fingers.

References Cited in the file of this patent

UNITED STATES PATENTS

| | | |
|---|---|---|
| 2,687,544 | Scinta | Aug. 31, 1954 |
| 2,834,976 | Oishei | May 20, 1958 |
| 2,861,289 | Nesson | Nov. 25, 1958 |
| 2,905,961 | Oishei et al. | Sept. 29, 1959 |